United States Patent [19]

Reschke et al.

[11] Patent Number: 5,029,601
[45] Date of Patent: Jul. 9, 1991

[54] ROCKABLE EARTHQUAKE VALVE

[76] Inventors: William E. Reschke, 4402 Promesa Cir., San Diego, Calif. 92124; Sergio Ruffo, Galeaha #65, Ensenada, Baja California, Mexico; Richard Lentz, 11097 Via Temprano, San Diego, Calif. 92124

[21] Appl. No.: 594,986

[22] Filed: Oct. 10, 1990

[51] Int. Cl.$^5$ ............................................. F16K 17/36
[52] U.S. Cl. ...................................................... 137/38
[58] Field of Search ................................... 137/38, 39

[56] References Cited

U.S. PATENT DOCUMENTS

| 1,180,482 | 4/1916 | Flanders . | |
|---|---|---|---|
| 2,585,316 | 2/1952 | Hobson . | |
| 3,783,887 | 1/1974 | Shoji | 137/38 |
| 4,331,171 | 5/1982 | Novi . | |
| 4,336,818 | 6/1982 | Dauvergne . | |
| 4,382,449 | 5/1983 | Nelson . | |
| 4,485,832 | 12/1984 | Plemmons et al. . | |
| 4,565,208 | 1/1986 | Ritchie et al. . | |
| 4,640,303 | 2/1987 | Greenberg | 137/38 |
| 4,799,505 | 1/1989 | Nowell . | |
| 4,844,113 | 7/1989 | Jones . | |

FOREIGN PATENT DOCUMENTS

| 163778 | 10/1982 | Japan | 137/38 |
|---|---|---|---|
| 13273 | 1/1983 | Japan | 137/38 |

Primary Examiner—Robert G. Nilson
Attorney, Agent, or Firm—Henri J. A. Charmasson

[57] ABSTRACT

A safety valve for automatically shutting-off fluid flow in response to excessive vibration specifically indicated for use as a seismically actuated gas valve. The inlet and outlet ports are separated by an horizontal septum having an aperture defining a circular valve seat. A ferrous ball is suspended above the aperture by a permanent magnet housed in a spherical member adjustably mounted in the roof of the valve above the aperture. The member houses a bulb-type level indicator used to adjust the position of the magnet in order to compensate for any askew position of the valve resulting from the orientations of the connecting pipes.

7 Claims, 1 Drawing Sheet

ROCKABLE EARTHQUAKE VALVE

FIELD OF THE INVENTION

This invention relates to valves and more specifically to valves which automatically close off fluid flow in response to a shock of a predetermined intensity.

BACKGROUND OF THE INVENTION

The typical configuration of a gas line shut-off valve responsive to earthquakes rely essentially on a ball seated on a precarious perch just above a valve seat. The ball, when knocked off its perch by a tremor, falls into the valve seat thus interrupting the flow of gas. Various interpretations of this basic concept are disclosed in U.S. Pat. Nos. 2,585,316 Hobson, 4,331,171 Novi, 4,382,449 Nelson, 4,485,832 Plemmons et al., and 4,565,208 Ritchie et al. Extreme care must be taken in the installation of these valves to mount them in an absolute level position. Any tilting in any direction will directly affect the sensitivity of the valve. If the surface from which the ball is perched is not perfectly horizontal, the ball may have a tendency to be dislodged by minute shocks or vibrations, or, depending upon the construction of the perch, may fail to respond to seismic tremors. The orientation of the valve body may be directly affected by the position of the connecting pipes. Thus, this leveling requirement renders most valves of the prior art impractical for use on existing gas installations where the pipes have not been carefully leveled.

The sensitivity of a shut-off valve which relies on a perched ball is also affected by rust, scaling, debris accumulating around the base of the ball, and other long-term corrosive phenomena.

SUMMARY OF THE INVENTION

The principal and secondary objects of this invention are to provide a simple and reliable gas shut-off valve responsive to seismic tremors, which does not require careful leveling, and can be directly connected to existing pipes regardless of their misorientation, and whose sensitivity is not affected by scaling rust and other long-term corrosive actions.

These and other objects are achieved by a shut-off valve in which a ferrous ball is suspended above a valve seat by a permanent magnet mounted in a rockable housing s that the position of the magnet can be manually adjusted after installation to compensate for any misalignment of the valve itself. A bulb-type level indicator at the top of the magnet holding member facilitates the leveling adjustment.

DESCRIPTION OF THE PREFERRED EMBODIMENT OF THE INVENTION

Figure 1:
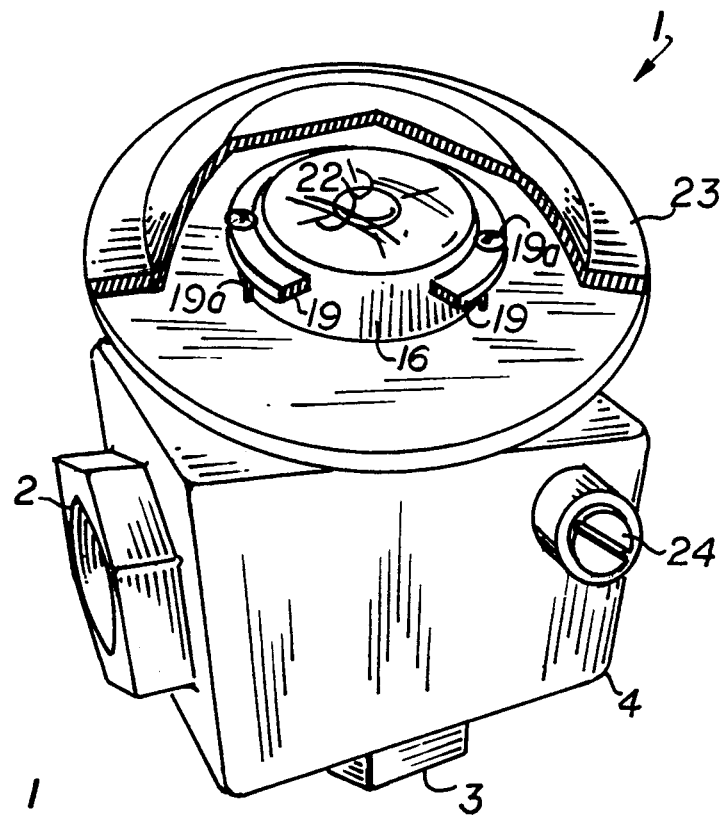
FIG. 1 is a perspective view of the preferred embodiment of the invention with a cut-out in the top cover exposing the leveling mechanism.

Referring now to the drawing, the preferred embodiment of a gas shut-off valve 1 according to the invention will be described. This particular valve is intended for installation in place of an elbow in a gas line. The valve has two female-type pipe connections 2 and 3 which are axially orthogonal to each other. The valve body 4 defines an internal chamber 5 with an inlet port integral with horizontal pipe connection 2 and outlet port 7 integral with pipe vertical connection 3. A septum 8 across the chamber 5 defines a horizontal section 9 having a circular aperture 10 therethrough. The aperture has a beveled upper rim 11 and an annular seal 12, together forming a valve seat 13. A ferrous ball 14 sized to hermetically rest against the valve seat 13, and close the aperture 10 is suspended above that aperture by a permanent magnet 15. The magnet is embedded in the center of a barrel-shaped member 16 which has a spherical lateral periphery 17 partially engaged into a circular opening 18 in the roof of the chamber 5, and secured therein by a collar 19. The collar 19 is secured around the member 16 by four screws 19a which can be loosened to allow manual tilting of the member 16 around any horizontal axis passing through the center of member 16. A bulb-type visual level 20 occupies the top of member 16. The glass top 21 of the level 20 has a central marking 22 which is used to position the member 16 and magnet 15 in an exact vertical position above the aperture 10. A snapping cap 23 completely covers the member, magnet and level assembly.

Figure 2:
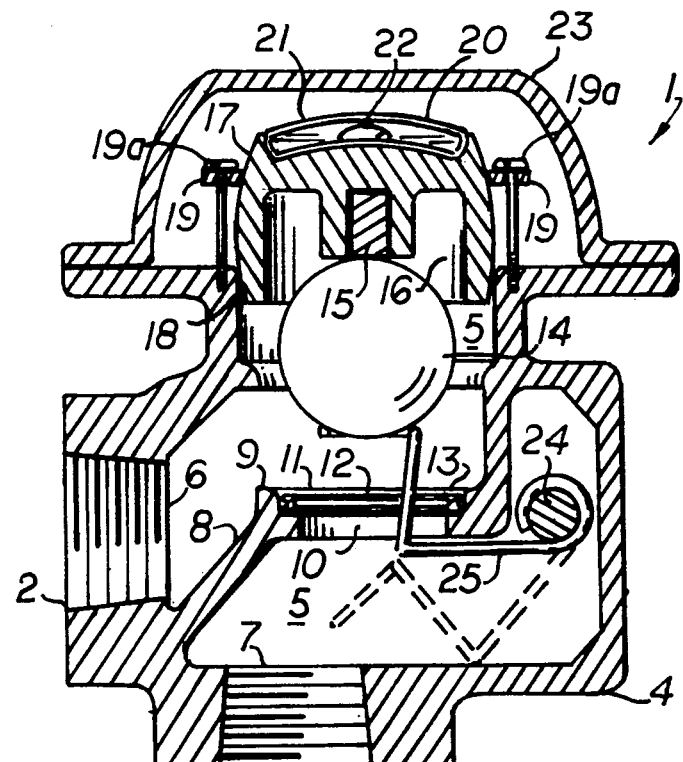
FIG. 2 is a median cross-sectional view of the embodiment.

A horizontal shaft 24 rotatively mounted through a lateral wall of the lower part of the chamber 5 is externally accessible for rotation by mean of a wrench or key. An internal arm 25 which is orthogonally connected to the shaft 24 is shaped and dimensioned to pass through the opening 10, and lift the ball 14 toward the magnet 15. The valve is recocked by rotation of the shaft 24 toward its upmost position illustrated in FIG. 2, until the ball is brought into contact with to the magnet 15. The arm 25 can be returned by counter-rotation of the shaft 24 to the lowermost position partially illustrated in phantom lines.

A shut-off valve 1 can be installed in lieu of an elbow on a gas line, even if the inlet pipe is not perfectly horizontal, or the outlet pipe is not perfectly vertical. Any misorientation of the pipes which results in the valve body being somewhat askew can be compensated by tilting the member 16 to a perfectly horizontal position where the top of the ball is symmetrically and intimately contacted by the magnet holding seat 26 of member 16. When so leveled, the sensitivity of the valve to seismic tremors is constant and depends entirely upon the magnetic attraction of the permanent magnet 15 on the ferrous ball 14. The ball is preferably coated with a corrosion resistant layer of plastic or stainless steel. The core ball 14 can also be made of ferrite material or other ferrous composites.

While the preferred embodiment of the invention has been described, modifications can be and other embodiments may be devised without departing from the spirit of the invention and the scope of the appended claims.

What is claimed is:

1. A safety valve for automatically shutting off fluid flow in response to excess vibration which comprises:
 a housing forming a chamber having a fluid inlet and a fluid outlet;
 a septum within said chamber between said inlet and outlet, said septum having an opening wherein said opening defines a valve seat lying in a substantially horizontal plane;
 a ferrous object shaped and dimensioned to rest upon said seat and hermetically close said aperture; and
 means for magnetically suspending said ferrous object above said aperature, wherein
 said means for suspending comprise:

a permanent magnet; and a means for adjusting the position of said magnet; and said means for adjusting comprise means for tilting said magnet about two horizontal axes orthogonally intercepting each other above said aperture.

2. The valve of claim 1, wherein said means for tilting comprises:

a member holding said magnet, and having a spherical, lateral, peripheral sector; and the roof of said housing having a circular opening intimately engaging said peripheral sector.

3. The valve of claim 2, wherein said member comprises a level indicator.

4. The valve of claim 3, wherein said level indicator comprises a liquid bulb indicator.

5. The valve of claim 2, which further comprises means for lifting said ferrous object from said valve seat toward said magnet.

6. The valve of claim 5, wherein said means for lifting comprises:

an internal shaft rotatively passing through a wall of said housing; and a lever normally connected to said shaft, wherein said lever is shaped and dimensioned to move through said aperture and lift said object toward said magnet upon rotation of the shaft.

7. The valve of claim 2, wherein said object has a spherical shape.

* * * * *